(12) United States Patent
Kimura

(10) Patent No.: US 8,060,359 B2
(45) Date of Patent: Nov. 15, 2011

(54) APPARATUS, METHOD AND COMPUTER PROGRAM PRODUCT FOR OPTIMUM TRANSLATION BASED ON SEMANTIC RELATION BETWEEN WORDS

(75) Inventor: Kazuhiro Kimura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1112 days.

(21) Appl. No.: 11/446,961

(22) Filed: Jun. 6, 2006

(65) Prior Publication Data

US 2007/0100601 A1    May 3, 2007

(30) Foreign Application Priority Data

Oct. 27, 2005    (JP) ................................ 2005-313227

(51) Int. Cl.
*G06F 17/28*    (2006.01)

(52) U.S. Cl. .... 704/4; 707/3; 707/999.01; 707/999.107; 455/456.5; 455/556.1; 704/8; 706/60; 715/700

(58) Field of Classification Search ...... 704/8; 715/700; 455/456.5, 556.1; 707/999.01, 3, 999.107; 706/60

See application file for complete search history.

(56) References Cited

U.S. PATENT DOCUMENTS

| | | | |
|---|---|---|---|
| 6,868,383 B1 | 3/2005 | Bangalore et al. | |
| 7,092,928 B1* | 8/2006 | Elad et al. ....................... | 706/60 |
| 7,660,828 B2* | 2/2010 | Johnston et al. ........ | 707/999.107 |
| 2002/0102988 A1* | 8/2002 | Myllymaki ................... | 455/456 |
| 2002/0111792 A1* | 8/2002 | Cherny ............................. | 704/8 |
| 2003/0009462 A1* | 1/2003 | Burnham .................. | 707/999.01 |
| 2003/0214523 A1* | 11/2003 | Wang ............................. | 345/700 |
| 2004/0204063 A1* | 10/2004 | Van Erlach ................ | 455/556.1 |
| 2006/0074980 A1* | 4/2006 | Sarkar ........................ | 707/104.1 |
| 2008/0104019 A1* | 5/2008 | Nath ................................. | 707/3 |

FOREIGN PATENT DOCUMENTS

JP    4-167063    6/1992

OTHER PUBLICATIONS

Office Action issued by the Japanese Patent Office on Sep. 4, 2007, for Japanese Patent Application No. 2005-313227, and partial English translation of the Office Action.

* cited by examiner

*Primary Examiner* — Richemond Dorvil
*Assistant Examiner* — Michael Colucci
(74) *Attorney, Agent, or Firm* — Finnegan, Henderson, Farabow, Garrett & Dunner, L.L.P.

(57) ABSTRACT

A machine translation apparatus includes a identification information detection unit that detects information identifiable to a designated object; a receiving unit that receives a source language sentence; a word dividing unit that divides the source language sentence into a plurality of first word by morphological analysis; a deixis detection unit that detects, from the divided word, a deixis indicating the object directly; a correspondence setting unit that sets the identification information of the designated object and the deixis in correspondence with each other; a semantic class determining unit that determines the semantic class indicating a semantic attribute of the designated objectbased on the identification information of the designated object corresponding to the deixis; and a translation unit that translates the source language sentence where the deixis is attached the attribute having the semantic class of the designated object.

17 Claims, 15 Drawing Sheets

FIG.2

| DEIXIS |
|---|
| */EP3 |
| */ET1 */EN1 |
| : |

| UNIQUE INFORMATION | SEMANTIC CLASS |
|---|---|
| shoes#123456789 | c#shoes |
| shoes#123456790 | c#shoes |
| ... | |
| jacket#234567891 | c#clothes |
| sake#345678912 | c#liqueur |
| pill#456789123 | c#medicine |
| hat#567891234 | c#hat |
| cap#678912345 | c#cap |

| DIRECTION OF TRANSLA-TION | CONDITION SECTION 501 | ACTION SECTION 124 |
|---|---|---|
| ENGLISH-JAPANESE | self[sw:"try on"], obj[sem:ako(c#shoes)] | set(self.tw,"履いてみる") 502 |
| | self[sw:"try on"], obj[sem:ako(c#clothes)] | set(self.tw,"試着する") 503 |
| JAPANESE-CHINESE | self[sw:"飲む"], obj[sem:ako(c#liqueur)] | set(self.tw,"喝") |
| | self[sw:"飲む"], obj[sem:ako(c#medicine)] | set(self.tw,"吃") |
| JAPANESE-ENGLISH | self[sw:"帽子",sem:c#hat] | set(self.tw,"hat") 504 |
| | self[sw:"帽子",sem:c#cap] | set(self.tw,"cap") 505 |

FIG.9

| | |
|---|---|
| これを飲むと元気になるよ | ～ J901 |
| 如果喝这当元气 | ～ C902 |
| 飲む | ～ J903 |
| 喝 | ～ C904 |
| 帽子 | ～ J905 |
| その帽子 | ～ J906 |

FIG.13

| DEIXIS | DISTANCE ATTRIBUTE |
|---|---|
| これ | less than 0.5m |
| それ | 0.5 ~ 3m |
| あれ | more than 3m |
| this | less than 1m |
| that | more than 1m |
| : | : |

APPARATUS, METHOD AND COMPUTER PROGRAM PRODUCT FOR OPTIMUM TRANSLATION BASED ON SEMANTIC RELATION BETWEEN WORDS

CROSS-REFERENCE TO RELATED APPLICATIONS

This application is based upon and claims the benefit of priority from the prior Japanese Patent Application No. 2005-313227, filed on Oct. 27, 2005; the entire contents of which are incorporated herein by reference.

BACKGROUND OF THE INVENTION

1. Field of the Invention

This invention relates to a machine translation apparatus, a machine translation method and a computer program product for optimum translation based on a semantic relation between words.

2. Description of the Related Art

Conventionally, the range of application of machine translation has been limited to technical documents or the like having limited sentence patterns. With the recent development of the machine translation technique, however, a wide range of documents including Web documents have come to be capable of being handled for machine translation. Also, the combination of the machine translation technique and the speech recognition technique has given rise to a situation in which the practical application of a spoken language translation (SLT) apparatus (interpretation machine) for translating the human speech in the real world in real time.

The spoken language translation is required to accommodate the language phenomena different from a written language, such as the word ellipses, omissions of functional words, word order inversions, filled pauses, or filler insertions, and thus has many problems yet to be overcome for practical application.

One of these problems is the frequent use of a deixis in the spoken language. The deixis is defined as an expression including a deictic word such as "this" or "that" and a pronoun such as "I" or "you," directly reffering to an object in the utterance environment. When a deixis is used, the translation without identifying a referent could not lead to an appropriate translation and deteriorate the translation quality.

The English sentence "Can I take this?" including the deixis "this," for example, can be translated into Japanese sentence without identifying the referent. In this case, however, the verb "take" will be translated into the Japanese verb "toru," meaning "get into one's hands," while "take" has a lot of other appropriate translations according to a context. To guarantee a more accurate translation, what is referred by "this," which is a direct object of "take," is required to be resolved. When "this" could be resoloved to refer a taxi, for example, the translation of "take" will be "noru" that means "travel or go by means of a certain kind of transportation," or when the "this" could be resolved to refer a bath, the appropriate translation will be "hairu," meaning "get into somewhere."

By identifying the referent of the deixis in this way, a more appropriate translation is made possible and the translation quality can be improved. A conventional technique of anaphora resolution has been proposed to resolve a referent of a deixis by searching a proper antecedent from the preceding speech, but the accuracy is not enough to practical use.

On the other hand, U.S. Pat. No. 6,868,383 discloses a technique in which the input speech including a deixis is properly interpreted by identifying the referent of the deixis, whose referent is displayed on a screen of a PDA (personal digital assistance). When a user makes an utterance with deixis, he or she is required to point a object on the screen by a mouse or pen, simultaneously. This technique makes it possible to identify the referent of a deixis even in the absence of a preceding speech.

The technique disclosed in U.S. Pat. No. 6,868,383, however, presupposes the presence of a referent in a virtual space of the screen on PDA. This technique, therefore, poses the problem of a very limited application range, when applied to spoken language translation, since SLT will be used in a various environment and the referred object can be anything in the real world.

SUMMARY OF THE INVENTION

According to one aspect of the present invention, a machine translation apparatus includes a identification information detection unit that detects unique information unique to a designated object; a receiving unit that receives a source language sentence; a word dividing unit that divides the source language sentence into a plurality of first word by morphological analysis; a deixis detection unit that detects, from the first words, a deixis indicating the object directly; a correspondence setting unit that sets the unique information of the designated object and the deixis in correspondence with each other; a semantic class determining unit that determines a semantic class indicating a semantic attribute of the designated object based on the unique information of the designated object corresponding to the deixis; and a translation unit that translates the source language sentence where the deixis is attached with the semantic class of the designated object.

According to another aspect of the present invention, a machine translation method includes receiving an source language sentence; dividing the source language sentence into plurality of first word by morphological analysis; detecting from the first words a deixis indicating the object directly; detecting unique information of the designated object; setting unique information of the designated object in correspondence with the deixis; determining a semantic class indicating the semantic attribute of the designated object based on the unique information of the designated object set in correspondence with the deixis; and translating the source language sentence where the deixis is attached the semantic class of the designated object.

A computer program product according to still another aspect of the present invention causes a computer to perform the method according to the present invention.

BRIEF DESCRIPTION OF THE DRAWINGS

FIG. 2 is a diagram illustrating an example of the data structure of a deixis stored in a deixis pattern storage unit;

FIG. 3 is a diagram illustrating an example of the data structure of semantic class information stored in a semantic class information storage unit;

FIG. 5 is a diagram illustrating an example of the data structure of the translation rule stored in a rule storage unit;

FIG. 9 is a diagram illustrating an example of the data processed in the application of Japanese-Chinese translation or Japanese-English translation in which nouns are translated differently;

FIG. 13 is a diagram illustrating an example of the data structure of the distance attribute stored in a distance attribute storage unit;

DETAILED DESCRIPTION OF THE INVENTION

Exemplary embodiments of a machine translation apparatus, a machine translation method and a computer program product according to the present invention are described in detail below with reference to the accompanying drawings.

In a machine translation apparatus according to a first embodiment, the information on an object designated by the user as soon as he/she begins to speak is detected, and the referent of the deixis included in the speech is identified and translated.

Figure 1:
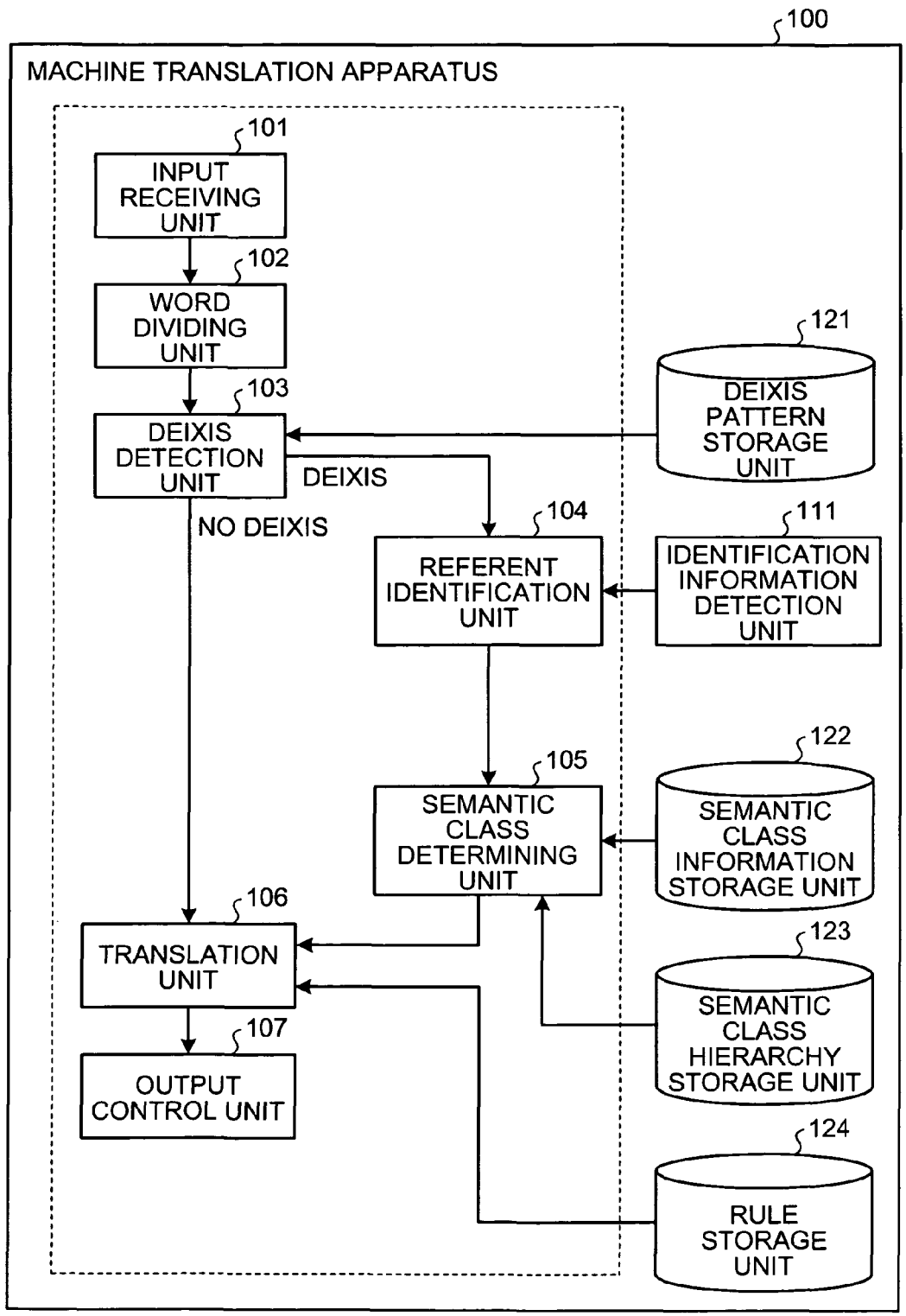
FIG. 1 is a block diagram showing a configuration of a machine translation apparatus according to a first embodiment.

FIG. 1 is a block diagram showing a configuration of the machine translation apparatus 100 according to the first embodiment. As shown in FIG. 1, the machine translation apparatus 100 includes a identification information detection unit 111, a deixis pattern storage unit 121, a semantic class information storage unit 122, a semantic class hierarchy storage unit 123, a rule storage unit 124, an input receiving unit 101, a word dividing unit 102, a deixis detection unit 103, a referent identification unit 104, a semantic class determining unit 105, a translation unit 106 and an output control unit 107.

The identification information detection unit 111 is for reading the information on an object from a no-contact IC tag buried in the object such as a radio frequency identification (RFID) tag, and configured, for example, of an RFID reader. The RFID tag is arranged in advance on an object such as a commodity and holds the information unique to the object. The identification information detection unit 111 is arranged, for example, at the forward end of a rod-like object such as an indication rod, and recognizing the RFID tag in the neighborhood of the position designated by the user with the indication rod, reads the information unique to the object stored in the RFID tag.

The unique information includes the information for uniquely identifying the object. Also, the unique information may have stored therein the semantic class itself of the object. In this case, the semantic class can be acquired directly from the unique information, and therefore the semantic class information storage unit 122 described later is eliminated.

The identification information detection unit 111 is not limited to the one for reading the information from the RFID tag, but may use any method capable of detecting the unique information of the object designated by the user. The unique information may be read, for example, from a bar code such as a two-dimensional bar code attached to the object.

Also, an image of the neighborhood may be acquired by a CCD (charge coupled device) camera and the object whose image is picked up may be specified by the image recognition technique. Also, the position of the local device may be recognized by the receiving function of the GPS (global positioning system), and by making an inquiry to a service provided on a network, the positional information (store information, etc.) of the present position may be acquired thereby to detect the information of the object. Further, the identification information detection unit 111 may acquire the information from the referent by a combination of any of the methods described above.

The deixis pattern storage unit 121 is for storing the pattern of the deixis which is an expression referring an object in the extra-linguistic context of the utterance. This deixis pattern storage unit 121 is accessed by the deixis detection unit 103 for detecting the deixis from a source language sentence that has been input.

FIG. 2 is a diagram illustrating an example of the data structure of the deixis stored in the deixis pattern storage unit 121. As shown in FIG. 2, the deixis pattern storage unit 121 stores a pattern indicating a deixis using the regular expression.

The deixis pattern is expressed by such a pattern as "word 1/part 1 of speech" or "word 1/part 1 of speech, word 2/part 2 of speech." The former is a pattern indicating that "word 1" for which the part of speech is "part 1 of speech" is a deixis. The latter is a pattern indicating that when "word 1" for which the part of speech is "part 1 of speech" is followed by a "word 2" for which the part of speech is "part 2 of speech," a word string of the two words combined with each other is a deixis.

Specifically, as shown in FIG. 2, the deixis pattern is expressed in such a form as "*/EP3" or "*/ET1 */EN1," where "EP3," "ET1," and "EN1" indicate a demonstrative pronoun, a demonstrative determiner, and a common noun, respectively. The symbol "*" is a regular expression which indicates an arbitrary word.

The word "this," for example, is a demonstrative pronoun ("EP3"), and therefore as a word corresponding to the former pattern, detected as a deixis. The word string "that hat," on the other hand, is a combination of a demonstrative determiner ("that") and a common noun ("hat"), and since the latter pattern applies, can be detected as a deixis.

The deixis pattern is not limited to the examples described above, but all patterns of word or word string generally considered a deixis can be stored.

The semantic class information storage unit 122 is for storing the semantic class information including the unique information of an object and a corresponding semantic class indicating the semantic attribute of the object, and the semantic class determining unit 105 is accessed to determine the semantic class of the object.

FIG. 3 is a diagram illustrating an example of the data structure of the semantic class information stored in the semantic class information storage unit 122. As shown in FIG. 3, the semantic class information storage unit 122 stores the unique information of an object and a corresponding semantic class of the object.

FIG. 3 also shows an example of the unique information of such a form that the character information indicating the type of an object commodity and the information (numerical value) for identifying the object uniquely are divided by a symbol "#". The form of the unique information is not limited to this, however, and any form can be employed which contains the information whereby at least an object can be uniquely identified.

The semantic class hierarchy storage unit 123 is for storing the hierarchical relation between a plurality of semantic classes, and accessed when the semantic class determining unit 105 checks the match between the semantic class of an object and the semantic class of a word contained in the deixis.

Figure 4:
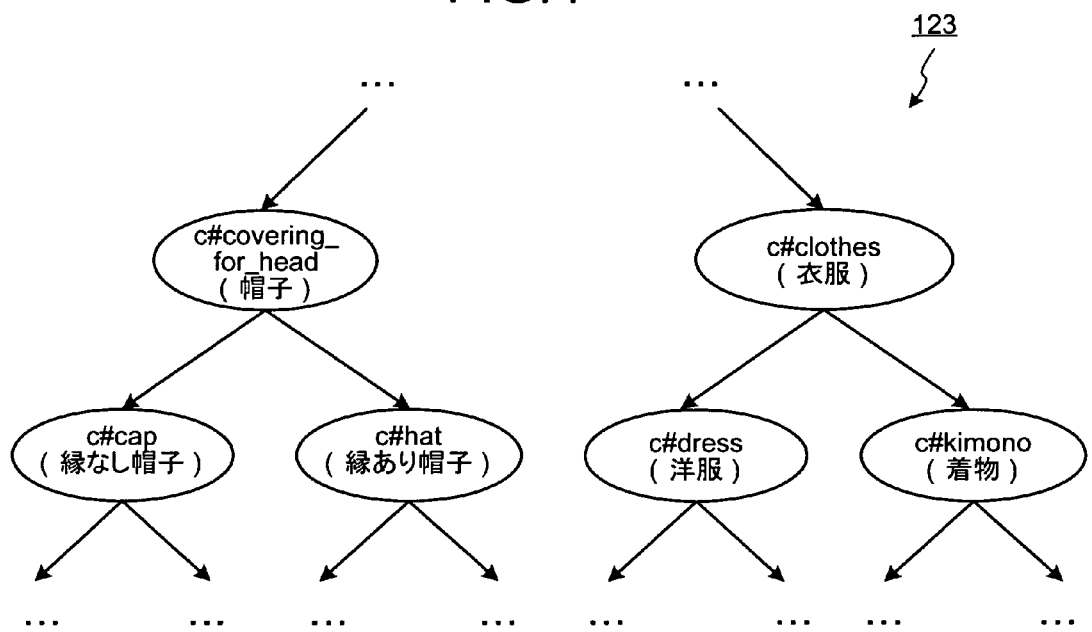
FIG. 4 is a diagram illustrating an example of the data structure of a hierarchical relation between the semantic classes stored in the semantic class hierarchy storage unit.

FIG. 4 is a diagram illustrating an example of the data structure of the hierarchical relation between the semantic classes stored in the semantic class hierarchy storage unit 123. In FIG. 4, the word described in each node shown as an ellipse indicates a semantic class. Also, each arrow indicates that the semantic class located at the starting point thereof is a superordinate concept of the semantic class located at the end of the arrow. Further, the symbol ". . ." indicates the portion omitted.

FIG. 4, for example, illustrates the hierarchical relation in which the semantic class "c#dress" or "c#kimono" is a subordinate concept of the semantic class "c#clothes."

The rule storage unit 124 is for storing the translation rule for judging how to determine a translation of a word in the source language in accordance with the semantic class of the particular word or the semantic class of a word constituting an object thereof. In this way, the rule storage unit 124 is accessed by the translation unit 106 to determine an appropriate translation corresponding to the semantic class of the translation object.

The deixis pattern storage unit 121, the semantic class information storage unit 122, the semantic class hierarchy storage unit 123, and the rule storage unit 124 can be provided as any generally-used storage medium such as an HDD (hard disk drive), an optical disk, or a memory card.

FIG. 5 is a diagram illustrating an example of the data structure of the translation rule stored in the rule storage unit 124. As shown in FIG. 5, the rule storage unit 124 stores a translation rule including the direction of translation, a condition section and an action section corresponding to each other.

The condition section designates a pattern to be collated with the partial structure included in the result of analysis of the dependency structure by the translation unit 106. The action section designates the operation applicable to the partial structure coincident with the pattern designated by the condition section. The condition section and the action section are described in detail later with the function of the translation unit 106.

The input receiving unit 101 accepts the source language sentence input by speech input from the user. According to this embodiment, the user inputs a sentence in a source language by speech. Thus, the input receiving unit 101 aurally recognizes the speech input and accepts the input of the source language sentence constituting the result of recognition. The speech recognition process can use a generally-used any speech recognition method including the LPC analysis, the hidden Markov Model (HMM), the dynamic programming, the neural network or the N-gram language model.

The input receiving unit 101 may be configured to receive the source language sentence input by recognition of a handwritten character or key input operation.

The word dividing unit 102 morphologically analyzes and divides into a word string the source language sentence accepted by the input receiving unit 101. In the morphological analysis, the connection matrix and the Least Bunsetsu's Number method are used for Japanese, and the probability model, the dynamic programming and the A* algorithm are used for English. Nevertheless, any method generally used can be employed. Also, a dictionary (not shown) storing the morphological information and semantic information is stored in a generally-used storage medium such as an HDD, an optical disk or a memory card and accessed for the morphological analysis process.

As the result of the morphological analysis, each word divided and the corresponding part of speech of each word are output. When the source language sentence "May I try this on?" is input, for example, the morphological analysis result "May/EAV I/EPI try/EVE, this/EP3 on/ED3" is output, where EAV, EP1, EVE, EP3, and ED3 indicate an auxiliary verb, a personal pronoun, a verb, a demonstrative pronoun, and an adverbial particle, respectively.

In the morphological analysis, the information other than parts of speech such as number, gender, aspect, modality, and translation can be obtained at the same time, though not described herein.

In the deixis detection unit 103, each word included in the word string output by morphological analysis of an input sentence by the word dividing unit 102 is collated with the deixis pattern stored in the deixis pattern storage unit 121 thereby to detect the deixis from the word string.

In the referent identification unit 104, the information on the referent detected by the identification information detection unit 111 is set in correspondence with the deixis detected by the deixis detection unit 103 thereby to identify the object referred by the deixis in the source language sentence input.

When the deixis detection unit 103 detects that the source language sentence input includes the deixis "this," for example, the referent detected by the identification information detection unit 111 is determined as the referent of the deixis "this."

The semantic class detining unit 105 is for determining the semantic class of a referent set in correspondence with the deixis by the referent identification unit 104. Specifically, in the semantic class determining unit 105, using the unique information of the referent detected by the identification information detection unit 111 as a search key, the corresponding semantic class is acquired from the semantic class information storage unit 122 and the semantic class thus acquired is determined as a semantic class of the referent.

In the process, the semantic class determining unit 105, before determining the acquired semantic class as that of the referent, checks the match between the acquired semantic class and the semantic class of the deictic expression acquired at the time of morphological analysis. As a result, even when the identification information detection unit 111 detects a referent by error, the selection of an erroneous translation by an erroneous semantic class is avoided.

When the very semantic class is included in the unique information of the referent detected by the identification information detection unit 111, the semantic class is extracted from the information on the referent and the extracted semantic class is determined as that of the referent.

In the translation unit 106, the word string resulting from the morphological analysis by the word dividing unit 102 is subjected to syntactic analysis and dependency structure analysis, and by reference to a two-language dictionary (not shown) and the rules on structural conversion to the target language of translation, a translation in the target language is output. The translation process executed by the translation unit 106 is applicable to any method generally used in the rule-based translation such as the transfer method.

Figure 6:
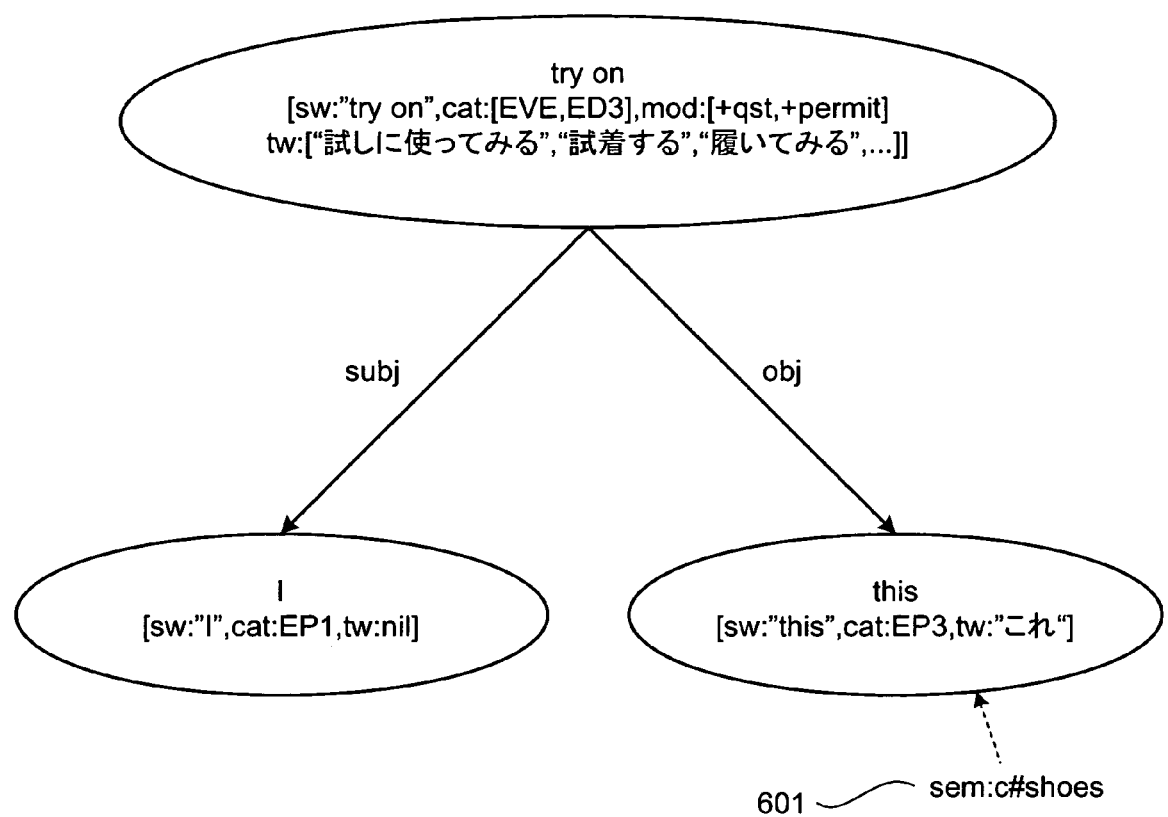
FIG. 6 is a diagram illustrating an example of the data structure of a dependency structure analysis result.

FIG. 6 is a diagram illustrating an example of the data structure of the dependency structure analysis result. The translation unit 106 outputs the dependency structure analysis result of a tree structure as shown in FIG. 6. In FIG. 6, each node indicated by an ellipse represents a word of the morphological analysis result, and each arrow between the words the relation between the words.

A word attribute defined by the symbols "[" and "]" is attached to each word. The word attribute is obtained by the morphological analysis in which the result of the dependency structure analysis is reflected and output. The word attribute can include a plurality of attributes set in the form of "attribute name: attribute value." Examples of the attributes are a source language expression (sw), a part of speech (cat), a target language expression (tw), a modality (mod), and a semantic class (sem).

The target language expression (tw) has stored therein a plurality of translation candidates in the target language for translation. With regard to the words "try on" in English in the upper part of the drawing, for example, three translation candidates in Japanese are shown. The candidate written at the left end of the target language expression indicates a default candidate selected when the semantic class of the object cannot be specified.

FIG. 6 illustrates an example of the result of the dependency structure analysis with the input of the source language sentence "May I try his on?" including the deixis "this." In this case, as indicated by the node of "this," the semantic class 601 determined by the semantic class determining unit 105 is added to the word attribute of the corresponding word. As a result, the same dependency structure as if the source language sentence "May I try shoes on?" is input. From the word order of "May I," the interrogative sentence attribute (+qst) is added to the modality attribute (mod) of the main verb "try on," and the node of "May" is extinguished and rewritten as the permit attribute (+permit) of the modality attribute of "try on."

The arrows connecting the nodes have attached thereto a label indicating the grammatical relation between the words. The subject-verb relation (subj) or the verb-object relation (obj) is an example.

The translation unit 106, when generating a translation from the dependency structure analysis result, refers to the translation rule stored in the rule storage unit 124, and executes the process for translating the words in accordance with the grammatical or semantic relation between the words in the source language sentence input.

Specifically, the translation unit 106 first makes a search to determine whether a pattern coincident with the partial structure included in the dependency structure analysis result exists in the condition section of the translation rule stored in the rule storage unit 124. In the presence of a coincident pattern in the condition section, the action section corresponding to the condition section is acquired, and in accordance with the translation rule described in the action section, the translation word is determined.

In the process, the semantic class determined by the semantic class determining unit 105 is attached to the word attribute constituting a deixis, and therefore the translation unit 106 can properly select a translation word by regarding that the word constituting a deixis has the particular semantic class.

The format of the condition section and the action section shown in FIG. 5 will now be described in detail. The condition section contains the description of a pattern collated with the partial structure in the form of, for example, "self [attribute name 1: attribute value 1], obj [attribute name 2: attribute value 2]." This indicates a pattern of the partial structure in which a node (self) with the attribute name 1 constituting the attribute value 1 corresponds to a node with the attribute name 2 constituting the attribute value 2 as an object.

As another example of the condition section, a pattern can be described in the form "self [attribute name 1: attribute value 1, attribute name 2: attribute name 2]." This simply indicates a pattern conditional on the existence of a node (self), as a partial structure, with the attribute name 1 constituting the attribute value 1 and the attribute name 2 constituting the attribute value 2.

The action section contains the description of the operation applicable to the partial structure in the form of, for example, "set (attribute name 3, attribute value 3)." This indicates the operation for setting the attribute value 3 for the attribute name 3.

The output control unit 107 is for controlling the process of outputting the translation result from the translation unit 106 to a display unit such as a liquid crystal display or a speech output unit such as a speaker.

When a translation is output by a speech in a target language, the output control unit 107 executes the process of outputting the translation output from the translation unit 106 as a synthesized speech. The speech synthesis process can use any generally-used method such as a text-to-speech system using the concatenative speech synthesis or formant speech synthesis.

Figure 7:
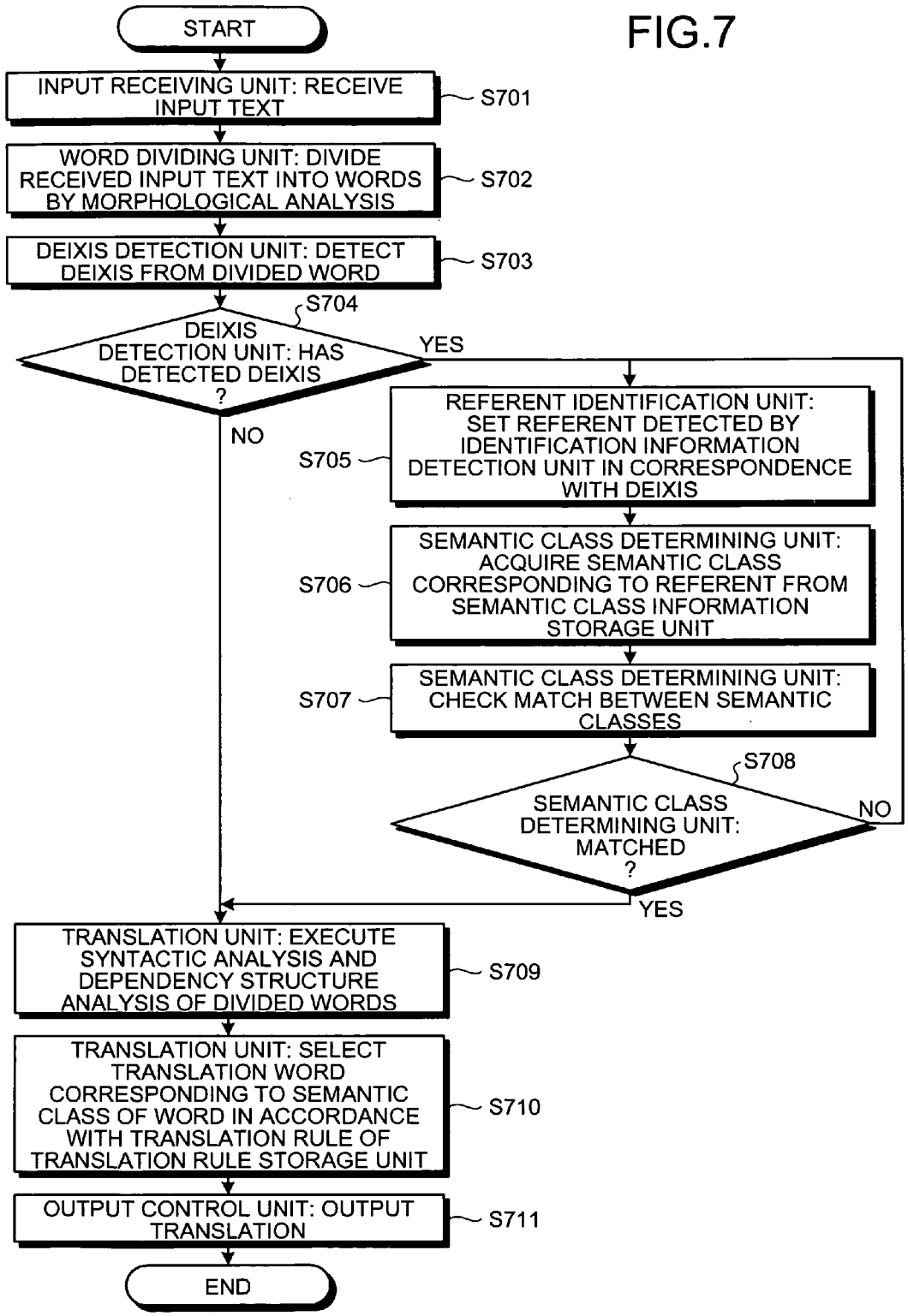
FIG. 7 is a flowchart showing a general flow of the machine translation process according to the first embodiment.

Next, the machine translation process using a machine translation apparatus 100 according to the first embodiment having the above-mentioned configuration is explained. FIG. 7 is a flowchart showing a general flow of the machine translation process according to the first embodiment.

First, the input receiving unit 101 accepts a sentence input from the user (step S701). According to this embodiment, the user inputs a source language sentence by speech, and therefore the input receiving unit 101 aurally recognizes the input speech and accepts the input of the source language sentence constituting the result of speech recognition.

Next, the word dividing unit 102 divides the input text received from the input receiving unit 101 into a plurality of words by morphological analysis (step S702).

Next, the deixis detection unit 103 detects a word or a word string constituting a deixis by referring to the deixis pattern storage unit 121 from a plurality of divided words (step S703). Specifically, the deixis detection unit 103 collates a word included in a word string or the word string constituting a plurality of continuous words with the deixis pattern stored in the deixis pattern storage unit 121, and when some of them are coincident with each other, detects the particular coincident word or word string, as the case may be, as a deixis.

An example of the word string constituting a plurality of continuous words included therein is "that hat" in which a demonstrative word ("that") is combined with a common noun ("hat"). In such a case, the deixis is expressed by a plurality of words but not by a single word.

Next, the deixis detection unit 103 determines whether a deixis is detected or not (step S704). When a deixis is detected (YES at step S704), the referent identification unit 104 sets the referent detected by the identification information detection unit 111 in correspondence with the deixis detected by the deixis detection unit 103 thereby to identify the referent (step S705).

Next, the semantic class determining unit 105 acquires a semantic class corresponding to the referent from the semantic class information storage unit 122 (step S706). Specifically, the semantic class determining unit 105 searches the semantic class information storage unit 122 using, as a search key, the unique information of the referent detected by the identification information detection unit 111, and acquires a semantic class corresponding to the particular unique information.

Assume, for example, that the identification information detection unit 111 has detected "shoes#123456789" as the unique information of the designated object. The semantic class determining unit 105 acquires "c#shoes" as a corresponding semantic class from the semantic class information storage unit 122 as shown in FIG. 3. The semantic class thus acquired is stored with a corresponding word constituting the deixis to permit reference at the time of subsequent translation by the translation unit 106.

Next, the semantic class determining unit 105 checks the match between the acquired semantic class and the semantic class of the deictic expression acquired at the time of morphological analysis (step S707).

When the deixis "this hat" is detected, for example, "c#hat" is attached as a semantic class of the particular deixis at the time of morphological analysis. When the identification information detection unit 111 erroneously detects the unique information "jacket#234567891" of a jacket existing in the neighborhood thereof, on the other hand, "c#clothes" is acquired as a corresponding semantic class from the semantic class information storage unit 122 as shown in FIG. 3.

The semantic class determining unit 105 accesses the semantic class hierarchy storage unit 123 and determines whether the two semantic classes described above are coincident with each other, and whether one is subordinate to the other or not. When the two semantic classes are coincident or one is a subordinate concept to the other, the two semantic classes are determined to have the match with each other.

Assuming that the information as shown in FIG. 4 is stored in the semantic class hierarchy storage unit 123, for example, the semantic class "c#hat" of the deixis and the semantic class "c#clothes" acquired by the semantic class determining unit 105 have no subordinate or superordinate relation. Specifically, what is called the "is_a_kind_of (AKO)" relation fails to hold. As a result, the semantic class determining unit 105 determines that the semantic classes have no match with each other.

When no semantic class is attached to a word constituting a deixis by morphological analysis such as when the demonstrative pronoun "this" is the only deixis, the process of checking the match between the semantic classes (steps S707, S708) is omitted.

After checking the match between the semantic classes (step S707), the semantic class determining unit 105 determines whether the semantic classes match with each other or not (step S708), and when there is no match between them (NO at step S708), the identification information detection unit 111 detects another referent candidate again and repeats the process (step S705).

When there is the match (YES at step S708), on the other hand, the translation unit 106 executes the translation process. In other words, the translation unit 106 first executes the syntactic analysis and the dependency structure analysis of the divided words (step S709).

Next, in accordance with the translation rule stored in the rule storage unit 124, the translation unit 106 selects a translation word corresponding to the semantic class of the word (step S710). In the process, the semantic class is attached to the word of the deixis, and therefore an appropriate translation word can be selected.

Assume, for example, that the translation rule shown in FIG. 5 is stored in the rule storage unit 124 and the dependency structure analysis result shown in FIG. 6 is obtained by the dependency structure analysis. In this case, the partial structure including the two nodes connected by the arrow on the right side of FIG. 6 coincides with the pattern of the condition section 501 shown in FIG. 5. As a result, in accordance with the rule of the action section 502 shown in FIG. 5, the Japanese 503 is selected as a translation of "try on."

After the translation process by the translation unit 106 (step S710), the output control unit 107 executes the process of outputting the translation from the translation unit 106 to a display unit (not shown) such as a liquid crystal display or a speech output unit (not shown) such as a speaker (step S711), thereby terminating the machine translation process.

In the process of steps S705 to S708, the identification information detection unit 111 detects one referent and by checking the match between the semantic classes for each detected referent in a step by step manner, acquires an appropriate referent finally. As an alternative, the identification information detection unit 111 may detect a plurality of referents at the same time, and select a referent meeting the match condition of the semantic classes from the plurality of the referents detected.

Figure 8:
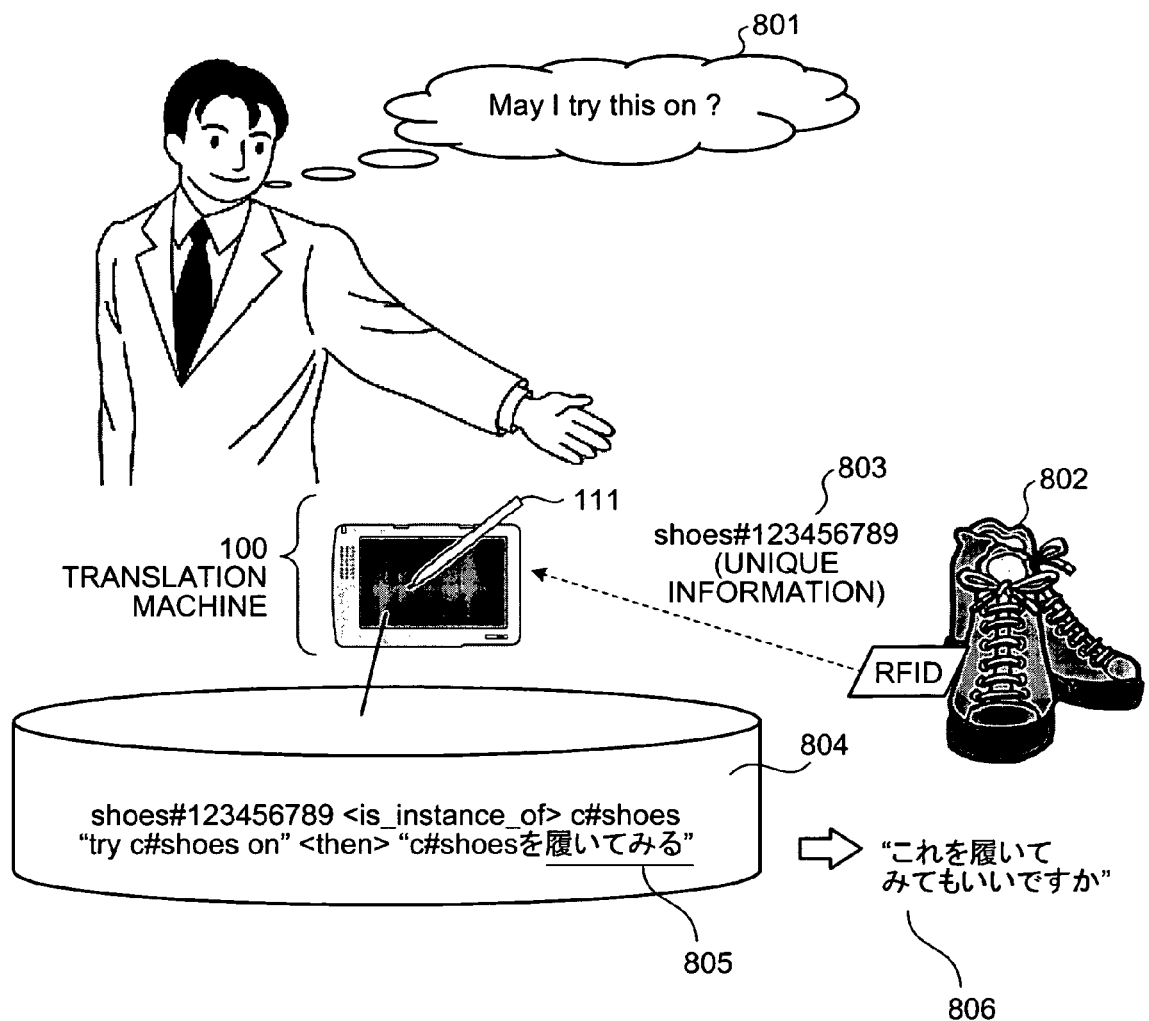
FIG. 8 is a diagram illustrating an example of the information processed in machine translation.

Next, a specific example of the machine translation process by the machine translation apparatus 100 configured as described above is explained. FIG. 8 is a diagram illustrating an example of the information processed in the machine translation process.

FIG. 8 shows an example in which the user speaking English as a native language utters the words "May I try this on?" on the shoe sale floor of a department store in Japan. In this case, the machine translation apparatus 100 is implemented as a PDA which has a speech input/output device built therein, and by recognizing and translating the English speech, outputs the translation result as a Japanese synthesized speech. Also, the input pen of the PDA has an RFID reader built therein, and has the function of transmitting by radio the information of the RFID tag thus read to the main body. The RFID tag recording the unique identification information is attached to each commodity on the shoe sale floor.

As shown in FIG. 8, assume that the user inputs the source language sentence 801 ("May I try this on?") by speech (step S701), while at the same time pointing at the commodity 802 having the RFID tag attached thereto by the input pen.

In,this case, a word string "May/EAV I/EP1 try/EVE this/ EP3 on/ED3" is output (step S702) as the morphological analysis result from the word dividing unit 102. Also, "this/ EP3" coincident with the deixis pattern "*/EP3" is detected as a deixis from the word string (YES at step S704), and set in correspondence with the unique information 803 ("shoes#123456789") detected by the identification information detection unit 111 from the RFID tag attached to the commodity 802 (step S705).

When the information as shown in FIG. 3 is registered in the semantic class information storage unit 122, "c#shoes" is acquired as a semantic class corresponding to the unique information 803 (step S706). As a result, the translation is possible regarding the object of "try on" as a word having the semantic class "c#shoes." Specifically, referring to the translation rule shown in FIG. 5, the Japanese 503 can be selected as a Japanese translation of "try on" (step S710).

This process is schematically shown at step 804 in FIG. 8. The upper portion of step 804 shows the determination that the referent has a semantic class "c#shoes" from the information "shoes#123456789" unique to the designate object. The lower portion of step 804, on the other hand, shows that the Japanese 805 is selected from the fact that "try this on" means "try shoes on."

As a result, the output control unit 107 outputs the Japanese 806 from the speech in Japanese constituting the target language of translation (step S711).

An example of translation of a word having a deixis as an object is described above. The method proposed here, however, is applicable also for the translation of a word in the subject-verb relation having a deixis as a subject in such an expression as "when this moves" or the translation of a word in the noun-attribute relation having a deixis as a noun in such an expression as "color of this" in which a word dependent grammatically or semantically on a deixis.

An example of English-Japanese translation of a verb is shown above. However, the invention is not limited to the language pair and the part of speech described above, but applicable also to other language pairs and parts of speech. FIG. 9 is a diagram for explaining an example of the data processed in an application to Japanese-Chinese translation or Japanese-English translation of a noun.

In Japanese-Chinese translation, for example, the translation of the Japanese sentence J901 without determining the semantic class of the deixis generally results in the Chinese sentence C902. Specifically, the Chinese word C904 is output as a standard translation of the Japanese word J903. This translation, though proper if the referent is a liquor, is not proper when the referent is a medicine.

The machine translation apparatus 100 according to this embodiment can determine whether the semantic class of the referent is a liquor (c#liqueur) or a medicine (c#medicine). When the translation rule is stored in the rule storage unit 124 as shown in FIG. 5, a proper Chinese translation can be selected in accordance with the semantic class. Referring to the aforementioned example, when referent is a medicine, the Chinese 504 shown in FIG. 5 can be selected as a proper translation of the Japanese word J903.

The translation of a noun is described below taking Japanese-English translation as an example. The Japanese word J905 exists as a word meaning both "hat" and "cap" in English regardless of the presence or absence of a brim. Therefore, the Japanese deixis J906 including the Japanese word J905 is required to be translated either as "the hat" or "the cap" according to whether a brim exists or not.

The machine translation apparatus 100 according to this embodiment can determine whether the semantic class of the referent is a hat having a brim (c#hat) or a cap without a brim (c#cap). When the translation rule shown in FIG. 5 is stored in the rule storage unit 124, a proper English translation can be selected in accordance with the semantic class. In the aforementioned example, the English 505 ("hat") is selected as a proper translation of the Japanese deixis J906 when the referent is a hat having a brim.

As described above, in the machine translation apparatus 100 according to the first embodiment, the information buried in the object designated by the user is detected and identified as a referent of the deixis included in the input speech. Therefore, the referent is not limited to the one registered in advance, but a highly accurate translation is possible of a source language sentence input in any of various situations.

A ubiquitous environment is now being rapidly prepared, and unique information has come to be buried in various products. According to this embodiment, the unique information of an object is specified and the referent of a deixis in an input speech can be identified taking advantage of this ubiquitous environment. Therefore, the referent is not required to be resolved from the preceding speech, and the translation quality is improved.

Also, the context processing such as anaphora resolution, which is expensive both in development and processing but not sufficiently accurate, can be avoided. Thus, an inexpensive, high-quality machine translation apparatus is realized. Further, the referent is less likely to be identified erroneously, and therefore the possibility of erroneous translation by an erroneous use of translation rules is reduced. As a result, a machine translation apparatus is provided which can carry out a proper translation in a great variety of operating environments.

In a machine translation apparatus according to a second embodiment, the semantic class of a designated object detected is acquired from an external server connected to a network and used for translation.

Figure 10:
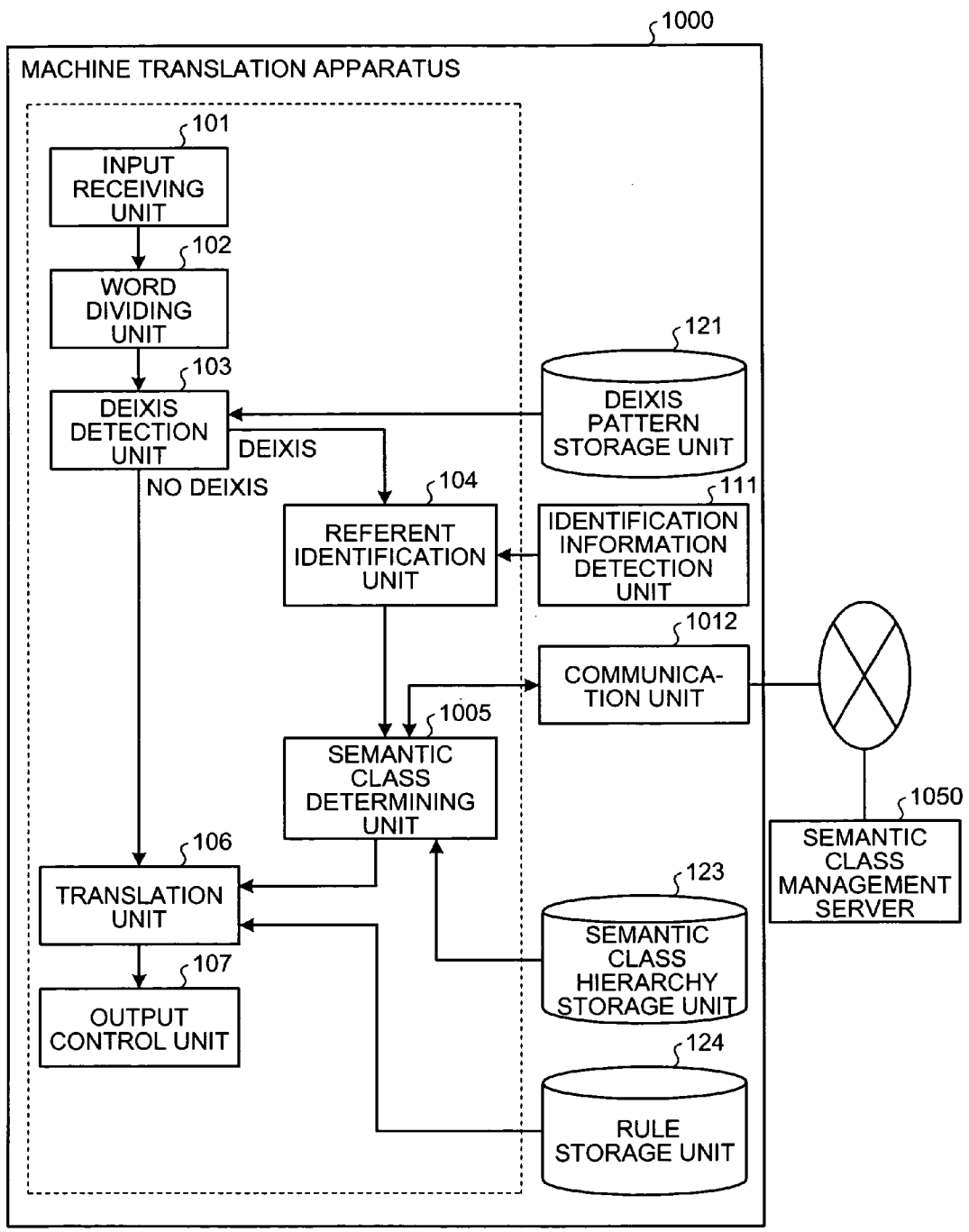
FIG. 10 is a block diagram showing a configuration of the machine translation apparatus according to a second embodiment of the invention.

FIG. 10 is a block diagram showing a configuration of the machine translation apparatus 1000 according to the second embodiment. As shown in FIG. 10, the machine translation apparatus 1000 includes a identification information detection unit 111, a communication unit 1012, a deixis pattern storage unit 121, a semantic class hierarchy storage unit 123, a rule storage unit 124, an input receiving unit 101, a word dividing unit 102, a deixis detection unit 103, a referent identification unit 104, a semantic class determining unit 1005, a translation unit 106, and an output control unit 107.

The second embodiment is different from the first embodiment in that the communication unit 1012 is added, the semantic class information storage unit 122 is eliminated, and the function of the semantic class determining unit 1005 is different from that in the first embodiment. The other parts of the configuration and the functions are similar to the corresponding ones in the block diagram of FIG. 1 showing the configuration of the machine translation apparatus 100 according to the first embodiment, and therefore, being designated by the same reference numerals, respectively, not described again.

The communication unit 1012 is for transmitting and receiving the information to and from the semantic class management server 1050 through a network such as the Internet. Nevertheless, the network is not limited to the Internet, but may be in any form generally used.

The semantic class management server 1050 has the function to manage the semantic class information as shown in FIG. 3 of the first embodiment, acquire the semantic class corresponding to the received unique information of the object and return an answer to the requesting party. This function can be realized, for example, as a Web service using a protocol such as SOAP (Simple Object Access Protocol).

According to this embodiment, as described above, the semantic class of a referent detected by the identification information detection unit 111 can be acquired by accessing the information on the semantic class managed by an external system, thereby leading to the advantage that the semantic classes are not required to be held in the local device. The information management cost can thus be greatly reduced especially in a ubiquitous environment requiring the management of the information on a vast amount of products.

Instead of making inquiry about the semantic class to the semantic class management server 105 each time of translation, the semantic class information may be read collectively from the semantic class management server 1050 at regular time intervals, and the semantic class can be determined by accessing the information thus read. As a result, the processing load imposed on the information transmission and receiving operation is reduced in a whole translation process.

In the semantic class determining unit 1005, the unique information of a designated object detected by the identification information detection unit 111 is transmitted to the semantic class management server 1050 through the communication unit 1012, the semantic class returned from the semantic class management server 1050 for the unique information transmitted is acquired through the communication unit 1012, and the semantic class thus acquired is determined as a semantic class of the particular referent.

The configuration to read the semantic class information collectively from the semantic class information management server 1050, like the first embodiment, includes a semantic class information storage unit 122, and by accessing the semantic class information storage unit 122, the semantic class determining unit 1005 determines the semantic class.

Figure 11:
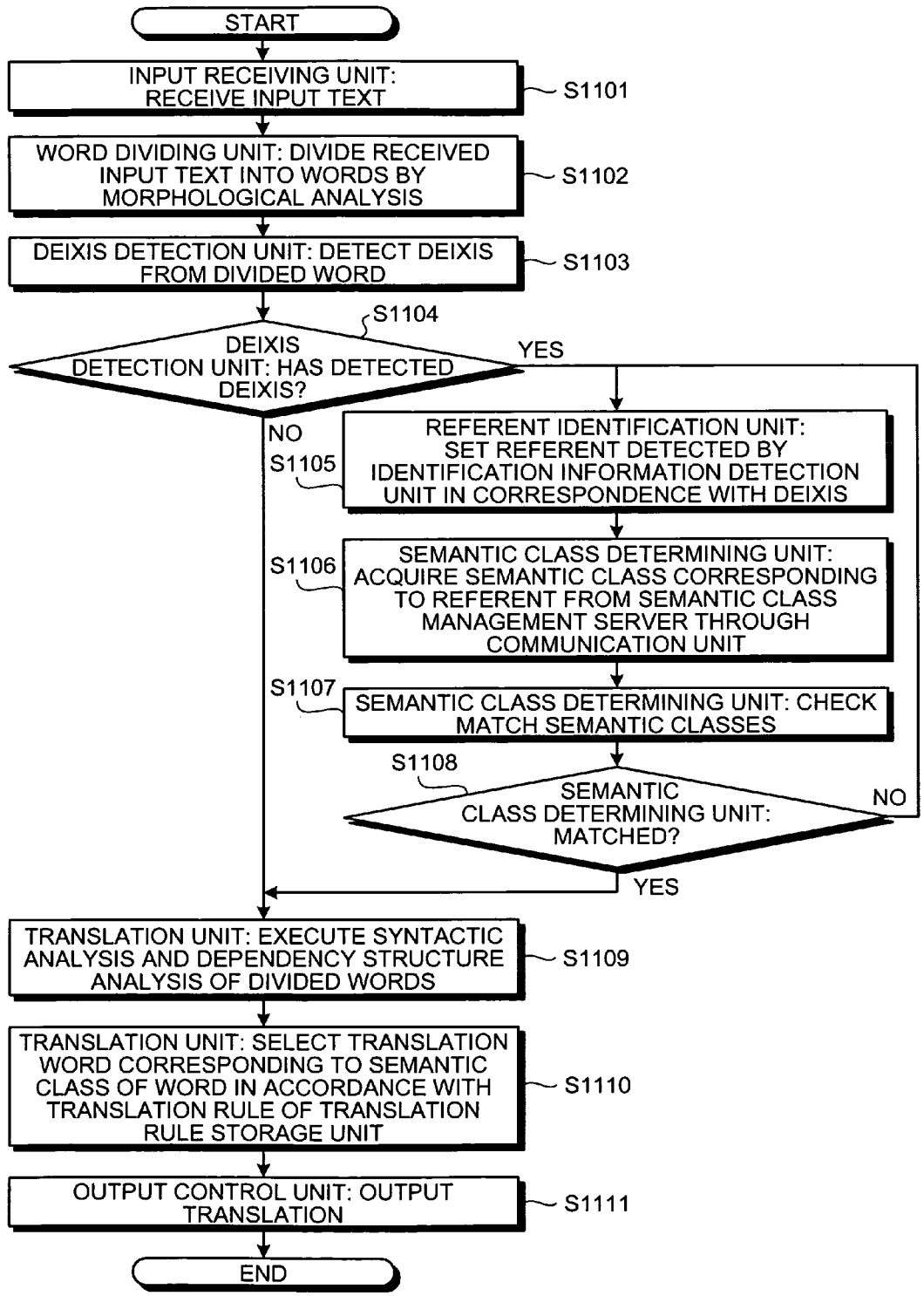
FIG. 11 is a flowchart showing a general flow of the machine translation process according to the second embodiment of the invention.

Next, the machine translation process of the machine translation apparatus 1000 according to the second embodiment having this configuration is explained. FIG. 11 is a flowchart showing a general flow of the machine translation process according to the second embodiment.

The input receiving process, the word dividing process, the deixis detection process, and the referent identification process of steps S1101 to S1105 are similar to the corresponding processes of steps S701 to S705 in the machine translation apparatus 100 according to the first embodiment and therefore not explained again.

After a referent is identified by the referent identification unit 104 at step S1105, the semantic class determining unit 1005 acquires the semantic class corresponding to the referent from the semantic class management server 1050 through the communication unit 1012 (step S1106). Specifically, the unique information of the designated object detected by the identification information detection unit 111 is transmitted to the semantic class management server 1050 and the semantic class returned is acquired.

The semantic class match checking process, the translation process and the output process of steps S1107 to S1111 are similar to the corresponding processes of steps S707 to S711 in the machine translation apparatus 100 according to the first embodiment, and therefore not explained again.

In the machine translation apparatus according to the second embodiment, as described above, the semantic class of the designated object detected is acquired from an external server connected to a network and can be used at the time of translation. Even in the portable machine translation apparatus having a limited storage capacity of the local device, therefore, the semantic class can be appropriately acquired and high-accuracy translation is made possible. Also, since the information can be centrally managed by the server, the updating of the machine translation apparatus is not required, and the latest information can always be utilized.

A machine translation apparatus according to a third embodiment determines whether the distance to a designated object detected is included in the distance range indicated by a deixis contained in the input speech, and when it is so included, a referent of the deixis is identified.

Figure 12:
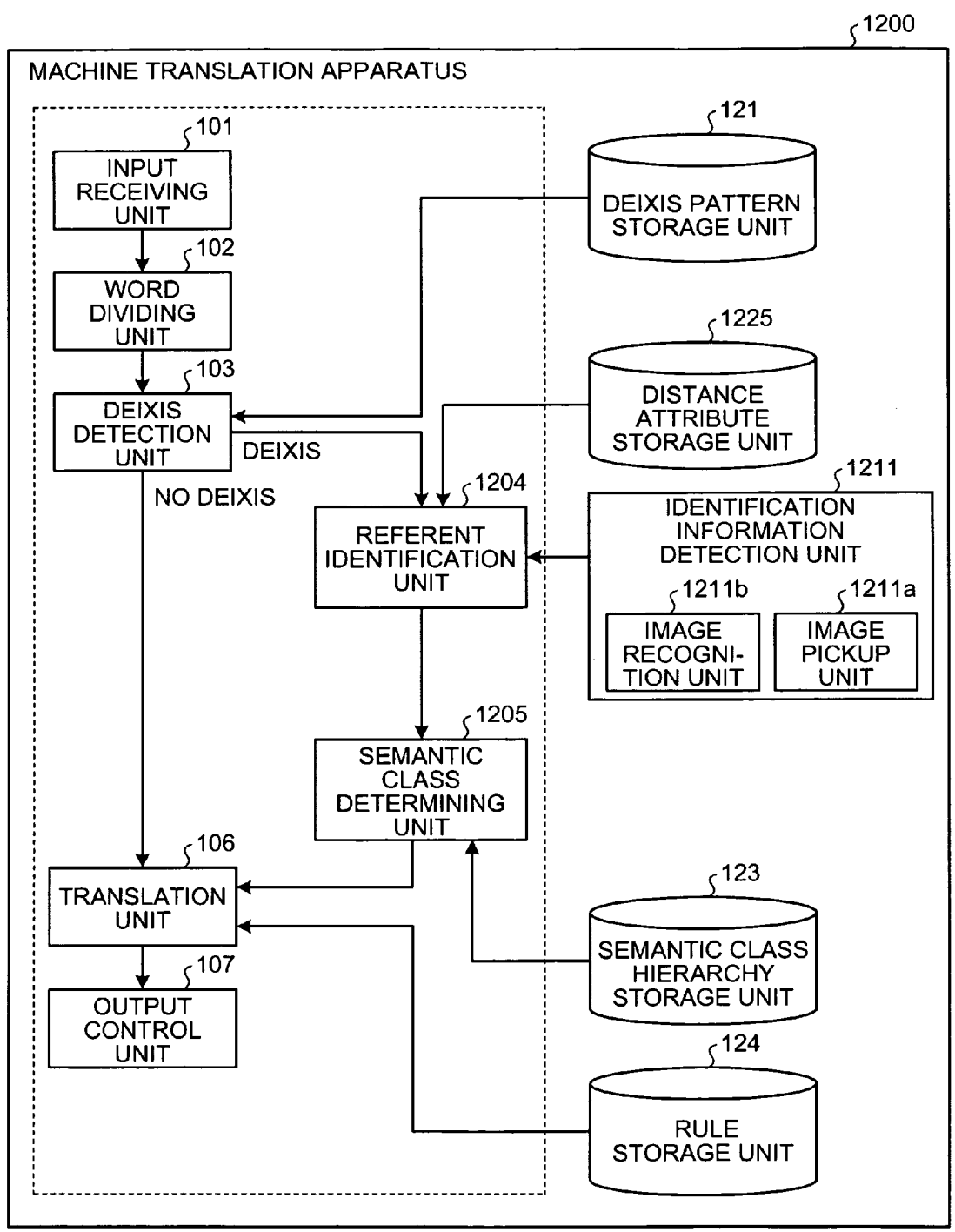
FIG. 12 is a block diagram showing a configuration of the machine translation apparatus according to a third embodiment.

FIG. 12 is a block diagram showing a configuration of the machine translation apparatus 1200 according to the third embodiment. As shown in FIG. 12, the machine translation apparatus 1200 includes a identification information detection unit 1211, a deixis pattern storage unit 121, a semantic class hierarchy storage unit 123, a rule storage unit 124, a distance attribute storage unit 1225, an input receiving unit 101, a word dividing unit 102, a deixis detection unit 103, a referent identification unit 1204, a semantic class determining unit 1205, a translation unit 106, and an output control unit 107.

The third embodiment is different from the first embodiment in that the distance attribute storage unit 1225 is added, the semantic class information storage unit 122 is eliminated and the functions of the identification information detection unit 1211, the referent identification unit 1204 and the semantic class determining unit 1205 are different from the corresponding functions of the first embodiment. The other parts of the configuration and the functions are similar to those in the block diagram of FIG. 1 showing the configuration of the machine translation apparatus 100 according to the first embodiment, and therefore, being designated by the same reference numerals, respectively, not explained again.

The distance attribute storage unit 1225 is for storing the distance attribute including the information on the range of distance to an object as indicated by the deixis, and may be configured of any storage medium such as an HDD, an optical disk or a memory card generally used.

Generally, a demonstrative word constituting a deixis has a distance attribute called a proximal, a medial or a distal. The proximal is indicative of an object existing very near to the speaker, and corresponds to "this" in English. The distal, on the other hand, indicates an object existing somewhat distant from the speaker and corresponds to "that" in English. The medial indicates an object located at about a middle point between the near demonstrator and the far demonstrator.

According to this embodiment, this distance attribute is stored in the distance attribute storage unit 1225 and accessed to identify a referent, so that when the actual distance to a detected referent is included in the distance range indicated by the deixis, the process is executed assuming that a correct referent has been detected.

FIG. 13 is a diagram illustrating an example of the data structure of the distance attribute stored in the distance attribute storage unit 1225. As shown in FIG. 13, the distance attribute storage unit 1225 stores a deixis and a corresponding distance attribute indicating the particular deixis. The distance range indicated by the deixis, for example, is designated as a distance attribute by a numerical values as shown in FIG. 13.

In the example shown in FIG. 13, only the deixis in Japanese and English are shown. Nevertheless, the distance attribute of the deixis of any other languages can be stored. Also, a plurality of deixis of such values that the distance ranges are superposed one on another may be set with equal effect.

The identification information detection unit 1211 includes an image pickup unit 1211a and an image recognition unit 1211b. The image pickup unit 1211a is an image pickup device such as a CCD camera, whereby the user can pick up an image including an object. According to this embodiment, in order to detect the distance from the local device to an object by referring to the image information, the image pickup unit 1211a picks up an image of the object stereoscopically with two cameras.

The image recognition unit 1211b is for specifying an object of which the image is picked up by the image pickup unit 1211a by the image recognition technique. The image recognition technique employed by any conventional method can be used to recognize an object from an image taking advantage of the pattern recognition.

The image recognition unit 1211b can determine the type of an object by the image recognition process, and therefore can directly attach the semantic class to the object at a particular time point. According to this embodiment, therefore, unlike in the first embodiment, the semantic class of the referent is not required to be acquired by accessing the semantic class information storage unit 122.

Also, the image recognition unit 1211b detects the distance to an object by the conventional stereo image processing technique based on the image information picked up by two cameras. As a result, the match between the distance to the object and the distance range indicated by the deixis can be confirmed.

Incidentally, the image pickup unit 1211a may be configured of one instead of two cameras, and the distance to the object may be detected by an independent distance measuring device such as a milliwave radar or a laser radar.

In the referent identification unit 1204, the information of the referent recognized by the image recognition unit 1211b is set in correspondence with the deixis detected by the deixis detection unit 103 thereby to identify the object referred by the deixis in the input source language sentence.

In the process, the referent identification unit 1204 accesses the distance attribute storage unit 1225 and determines whether the distance to the object recognized by the image recognition unit 1211b is included or not in the distance range indicated by the deixis detected by the deixis detection unit 103. Only when the distance to the object is so included, the recognized object is set in correspondence with the deixis. When the distance to the object is not included in the distance range indicated by the deixis, on the other hand, the image recognition unit 1211b executes the recognition process again and repeats the process until the distance to the object comes to be included in the distance range.

The semantic class determining unit 1205 checks the match between the semantic class of the object recognized by the image recognition unit 1211b and the semantic class of the referent acquired at the time of morphological analysis. Even when the designated object is erroneously detected by the image recognition unit 1211b, therefore, the selection of an erroneous translation by an erroneous semantic class can be avoided.

Figure 14:
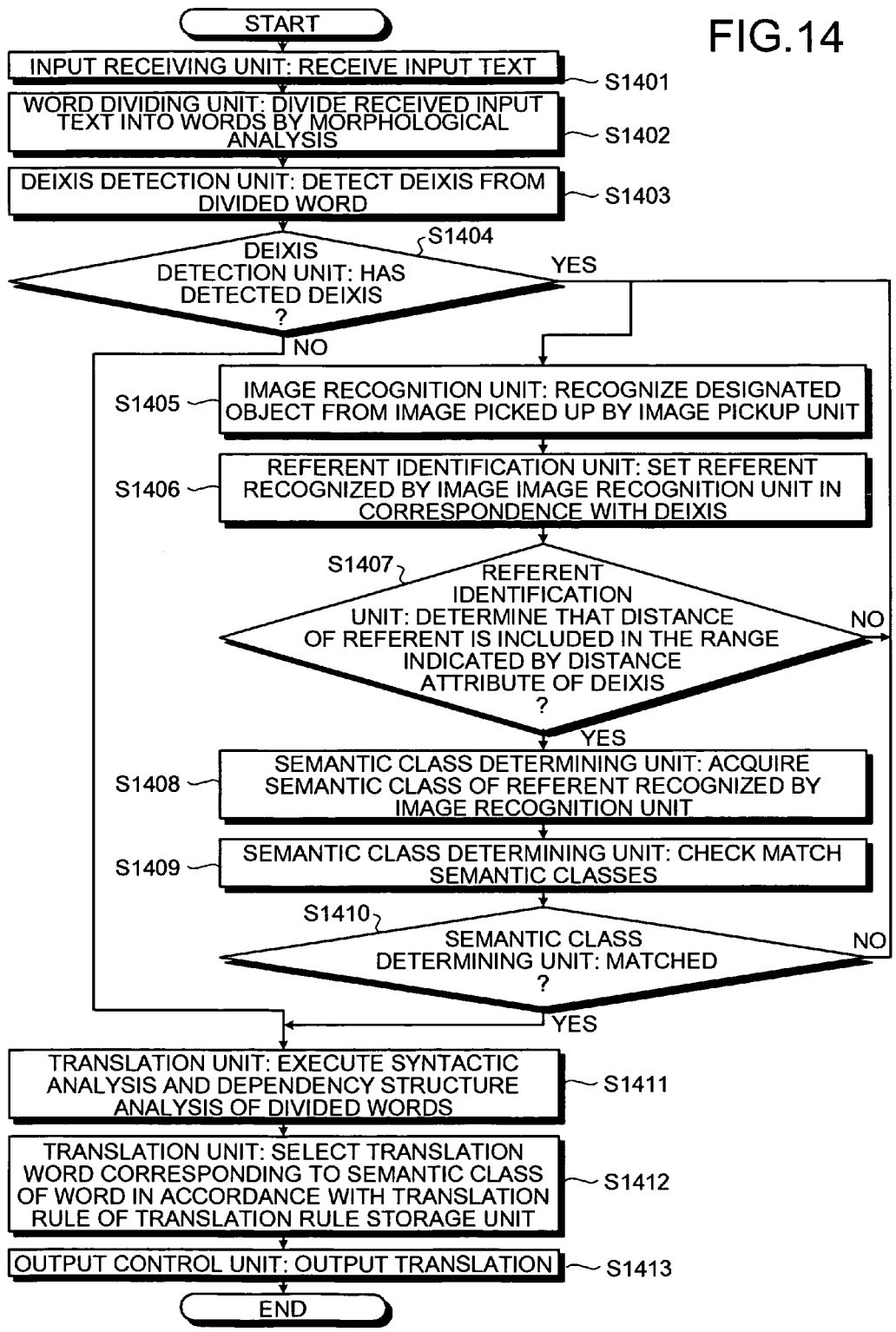
FIG. 14 is a flowchart showing a general flow of the machine translation process according to the third embodiment.

Next, the machine translation process by the machine translation apparatus 1200 according to the third embodiment having the aforementioned configuration is explained. FIG. 14 is a flowchart showing a general flow of the machine translation process according to the third embodiment.

The input receiving process, the word dividing process, and the deixis detection process of steps S1401 to S1404 are similar to the corresponding processes of steps S701 to S704 in the machine translation apparatus 100 according to the first embodiment, and therefore not described again.

When the deixis is detected at step S1404 (YES at step S1404), the image recognition unit 1211b recognizes the designated object from the image picked up by the image pickup unit 1211a (step S1405). At the same time, the semantic class is attached to the designated object and the distance to the designated object is detected.

Next, in the designated object identification unit 1204, the designated object recognized by the image recognition unit 1211b is set in correspondence with the deixis detected by the deixis detection unit 103 thereby to identify the referent (step S1406).

Then, the referent identification unit 1204 determines whether the distance to the referent detected by the image recognition unit 1211b is included or not in the range indicated by the distance attribute of the deixis (step S1407). When the deixis is "this" and the image recognition unit 1211b recognizes the distance to the object as 3 meters, for example, assume that the distance attribute is defined as shown in FIG. 13. It is determined that the recognized distance of 3 meters is not included in the range of 1 meter indicated by "this."

Upon determination that the distance to the object is not included in the range indicated by the distance attribute of the deixis (NO at step S1407), the image recognition unit 1211b again executes the process of recognizing the designated object and repeats the process (step S1405).

Upon determination that the distance to the referent is included in the range indicated by the distance attribute of the deixis (YES at step S1407), on the other hand, the semantic class determining unit 1205 acquires the semantic class of the referent recognized by the image recognition unit 1211b (step S1408).

The semantic class determining process, the translation process, and the output process of steps S1409 to S1413 are similar to the corresponding processes of steps S707 to S711 in the machine translation apparatus 100 according to the first embodiment, and therefore not described again.

As described above, the machine translation apparatus according to the third embodiment determines whether the distance to the designated object detected is included in the range of the distance indicated by the deixis included in the input speech, and only when the distance to the object is so included, the referent of the deixis can be identified. Even when the referent is erroneously detected, therefore, the possibility of erroneous translation is reduced.

In a machine translation apparatus according to a fourth embodiment, the positional information on a geological point of a referent is acquired by the GPS function, and this positional information is acquired as unique information of the designated object.

Figure 15:
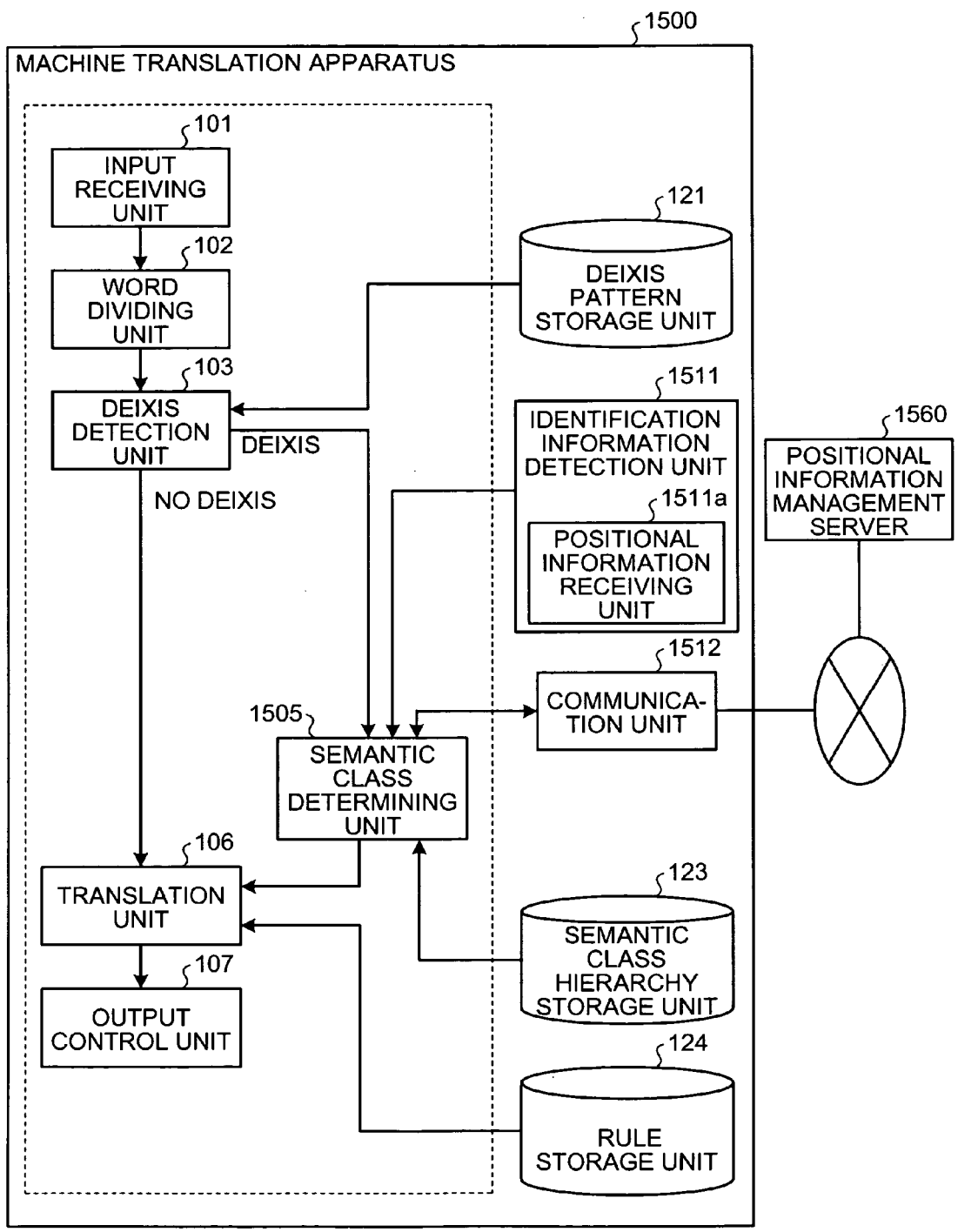
FIG. 15 is a block diagram showing a configuration of the machine translation apparatus according to a fourth embodiment of the invention.

FIG. 15 is a block diagram showing a configuration of the machine translation apparatus 1500 according to the fourth embodiment. As shown in FIG. 15, the machine translation apparatus 1500 includes a identification information detection unit 1511, a communication unit 1512, a deixis pattern storage unit 121, a semantic class hierarchy storage unit 123, a rule storage unit 124, an input receiving unit 101, a word dividing unit 102, a deixis detection unit 103, a semantic class determining unit 1505, a translation unit 106, and an output control unit 107.

The fourth embodiment is different from the second embodiment in the functions of the identification information detection unit 1511, the communication unit 1512, and the semantic class determining unit 1505. Also, the fourth embodiment, unlike the second embodiment, has no referent identification unit 104. The other parts of the configuration and functions are similar to the corresponding ones in the block diagram of FIG. 10 showing the configuration of the machine translation apparatus 1000 according to the second embodiment, and therefore, being designated by the same reference numerals, respectively, not described again.

The identification information detection unit 1511 includes a positional information receiving unit 1511a for recognizing the position of the local device by the GPS receiving function. The information on the position of the local device includes the latitude and longitude of the local device.

The communication unit 1512 is for transmitting and receiving the information to and from the positional information management server 1560 through a network such as the Internet.

The positional information management server 1560 is connected to the network, and has the function to return the positional information including the store information on the store located at the position indicated by the positional information including the latitude and longitude of the particular position.

In the semantic class determining unit 1505, the positional information including the latitude and longitude of the local device received from the positional information receiving unit 1511a is transmitted to the positional information management server 1560, the positional information returned from the positional information management server 1560 in response to the transmitted positional information is acquired through the communication unit 1512, and the semantic class of the deixis is determined from the positional information thus acquired.

Specifically, when the information that a shoe store is located at the present position is returned from the positional information management server 1560, for example, the semantic class determining unit 1505 estimates that the semantic class indicating the deixis included in the source language sentence spoken by the user is "c#shoes."

In this way, according to this embodiment, even when the information on the referent cannot be acquired directly, the positional information of the position of the referent is acquired by the GPS receiving function or the like, and the semantic class of the object indicated by the deixis can be estimated by accessing the positional information acquired. As a result, unlike when the deixis is translated as it is, a more proper translation can be selected.

Figure 16:
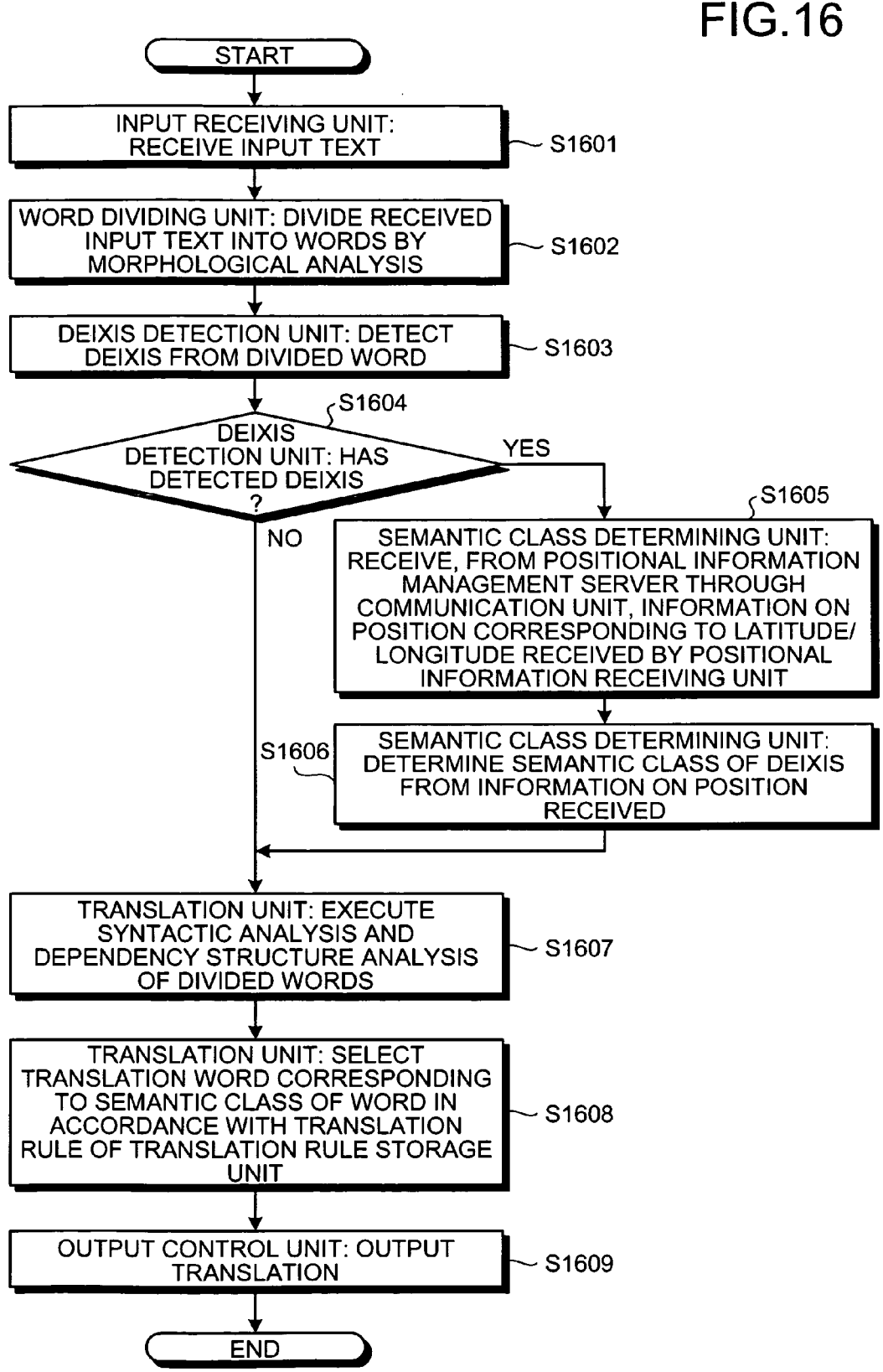
FIG. 16 is a flowchart showing a general flow of the machine translation process according to the fourth embodiment.

Next, the machine translation process of the machine translation apparatus 1500 according to the fourth embodiment having the aforementioned configuration is explained. FIG. 16 is a flowchart showing a general flow of the machine translation process according to the fourth embodiment.

The input receiving process, the word dividing process and the deixis detection process of steps S1601 to S1604 are similar to the corresponding processes of steps S1101 to S1104 in the machine translation apparatus 1000 according to the second embodiment, and therefore not explained again.

When a deixis is detected at step S1604 (YES at step S1604), the positional information corresponding to the latitude and longitude received by the positional information receiving unit 1511a is received by the semantic class determining unit 1505 from the positional information management server 1560 through the communication unit 1512 (step S1605).

Next, the semantic class determining unit 1505 determines the semantic class of the deixis from the received positional information (step S1606). Specifically, the store information together with the corresponding semantic class are stored in a storage unit (not shown), and by accessing this information, the semantic class on the received store information is acquired and determined as a semantic class of the deixis.

Also, the semantic class may be included in the positional information returned from the positional information management server 1560. In this case, the semantic class determining unit 1505 extracts the semantic class from the received positional information and determines it as a semantic class of the deixis.

The translation process and the output process of steps S1607 to S1609 are similar to the corresponding processes of steps S1109 to S1111 in the machine translation apparatus 1000 according to the second embodiment, and therefore not described again.

As described above, the machine translation apparatus according to the fourth embodiment can determine the semantic class of a referent by accessing the positional information acquired by the GPS function. Even when the referent cannot be specified, therefore, an appropriate translation of the deixis can be selected in accordance with the semantic class, thereby making possible a highly accurate translation of the source language sentence input in various situations.

A machine translation program executed in the machine translation apparatuses according to the first to fourth embodiments is provided by being built in a ROM (read-only memory) or the like.

The machine translation program executed by the machine translation apparatuses according to the first to fourth embodiments may alternatively be provided in the form stored in a computer-readable recording medium such as a CD-ROM (compact disk read-only memory), a flexible disk (FD), a CD-R (compact disk recordable), or a DVD (digital versatile disk) with a file of installable or executable type.

Further, the machine translation program executed in the machine translation apparatuses according to the first to fourth embodiments may be stored in a computer connected to a network such as the Internet and provided by being downloaded through the network. Also, the machine translation program executed in the machine translation apparatuses according to the first to fourth embodiments may be provided or distributed through a network such as the Internet.

The machine translation program executed in the machine translation apparatuses according to the first to fourth embodiments has a modular configuration including the various parts (the input receiving unit, the word dividing unit, the deixis detection unit, the referent identification unit, the semantic class determining unit, the translation unit, the output control unit) described above. In actual hardware, the CPU (central processing unit) reads and executes the machine translation program from the ROM, so that each unit described above is downloaded to and generated on the main storage unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A machine translation apparatus comprising:
a central processing unit;
an identification information detection unit that detects, from a designated physical object or an attachment thereto, identification information of the designated object;
a receiving unit that receives a source language sentence;
a word dividing unit that divides the source language sentence into a plurality of first words by morphological analysis;
a deixis detection unit that detects, from the first words, a deixis indicating the designated object;
a correspondence setting unit that sets a correspondence between the identification information of the designated object and the deixis;
a semantic class determining unit executing on the central processing unit that determines a semantic class indicating a semantic attribute of the designated object previously associated with the identification information of the designated object; and
a translation unit that translates the source language sentence according to the determined semantic class of the designated object corresponding to the deixis.

2. The machine translation apparatus according to claim 1, wherein the identification information detection unit detects the identification information including the semantic class, and the semantic class determining unit acquires the semantic class included in the identification information and determines the semantic class as the semantic class of the designated object.

3. The machine translation apparatus according to claim 1, further comprising a semantic class information storage unit that stores semantic class information where an identifier to identify the designated object is associated with the semantic class of the designated object,
- wherein the identification information detection unit detects the identification information including the identifier, and
- the semantic class determining unit acquires, from the semantic class information storage unit, the semantic class corresponding to the identifier included in the identification information, and determines the semantic class as the semantic class of the designated object.

4. The machine translation apparatus according to claim 1, further comprising a communication unit that is connected to a network, transmits the identifier to a semantic class management server, returns the semantic class corresponding to an identifier for identifying the designated object, and receives the semantic class returned from the semantic class management server,
- wherein the identification information detection unit detects the identification information including the identifier, and
- the semantic class determining unit transmits the identifier to the semantic class management server through the communication unit, acquires through the communication unit the semantic class returned from the semantic class management server in response to the identifier transmitted, and determines the semantic class as a semantic class of the designated object.

5. The machine translation apparatus according to claim 2, further comprising a semantic class hierarchy storage unit that stores a hierarchical relation between a plurality of the semantic classes,
- wherein the semantic class determining unit accesses the semantic class hierarchy storage unit, determines whether the semantic class is included in the semantic class of the word included in the deixis, and upon determination that the semantic class is so included, determines the semantic class as the semantic class of the designated object.

6. The machine translation apparatus according to claim 5, wherein, when the semantic class determining unit determines that the semantic class is not included in the semantic class of the word included in the deixis, the correspondence setting unit sets the identification information of the designated object detected again by the identification information detection unit in correspondence with the deixis detected by the deixis detection unit.

7. The machine translation apparatus according to claim 1, further comprising a distance attribute storage unit that stores the deixis and the corresponding distance attribute including information on the range of the distance to the object indicated by the deixis,
- wherein the correspondence setting unit acquires the distance attribute corresponding to the deixis from the distance attribute storage unit, determines whether the distance to the designated object from the identification information detection unit is included in the distance range included in the acquired distance attribute, and when so determined, sets the identification information detected by the identification information detection unit in correspondence with the deixis detected by the deixis detection unit.

8. The machine translation apparatus according to claim 7, wherein upon determination that the distance from the identification information detection unit to the designated object is not included in the distance range included in the acquired distance attribute, the correspondence setting unit determines whether the distance from the identification information detection unit to the designated object detected again is included in the distance range included in the acquired distance attribute.

9. The machine translation apparatus according to claim 1, further comprising a rule storage unit that stores a rule in which the semantic class is set in correspondence with a second word in a target language,
- wherein the translation unit acquires, from the rule storage unit, the second word corresponding to the semantic class attached to the deixis, and translates the deixis into the second word acquired.

10. The machine translation apparatus according to claim 1, further comprising a rule storage unit that stores a rule in which a third word in a source language is set in correspondence with a second word in a target language, the third word depending on the semantic class grammatically or semantically,
- wherein the translation unit acquires, from the rule storage unit, the second word corresponding to the third word which depends on the semantic class attached to the deixis and which is included in the source language sentence, and translates the third word into the second word.

11. The machine translation apparatus according to claim 1, wherein the identification information detection unit detects the identification information from a no-contact IC tag attached to the designated object.

12. The machine translation apparatus according to claim 1, wherein the identification information detection unit detects the identification information from a bar code attached to the designated object.

13. The machine translation apparatus according to claim 1, wherein the identification information detection unit includes
- an image pickup unit that picks-up an image of the designated object; and
- an image recognition unit that analyzes the image picked up and acquiring the identification information including the semantic class of the designated object.

14. The machine translation apparatus according to claim 1,
- wherein the identification information detection unit receives positional information including information on latitude and longitude where the designated object exists, and detects the received positional information as the identification information.

15. The machine translation apparatus according to claim 14, further comprising a communication unit that is connected to a network, transmits the positional information to the positional information management server for returning the information on the position corresponding to the positional information, and receives the information on the position returned from the positional information management server,
- wherein the semantic class determining unit transmits the positional information to the positional information management server through the communication unit, acquires, through the communication unit, the information on the position returned from the positional information server in response to the transmitted positional information, and based on the information on the position thus acquired, determines the semantic class.

16. A machine translation method comprising:
receiving a source language sentence;
dividing the source language sentence into plurality of first words by morphological analysis;
detecting from the first words a deixis indicating a designated physical object;
detecting, from the designated object or from an attachment thereto, identification information of the designated object;
setting a correspondence between the identification information of the designated object and the deixis;
determining, using a computer processor, a semantic class indicating a semantic attribute of the designated object previously associated with the identification information of the designated object; and
translating the source language sentence according to the determined semantic class of the designated object corresponding to the deixis.

17. A non-transitory computer readable medium including programmed instructions for machine translation, wherein the instructions, when executed by a computer, cause the computer to perform:
receiving a source language sentence;
dividing the source language sentence into plurality of first words by morphological analysis;
detecting from the first words a deixis indicating a designated physical object;
detecting, from the designated object or from an attachment thereto, identification information of the designated object;
setting a correspondence between the identification information of the designated object and the deixis;
determining a semantic class indicating a semantic attribute of the designated object previously associated with the identification information of the designated object; and
translating the source language sentence according to the determined semantic class of the designated object corresponding to the deixis.

* * * * *